UNITED STATES PATENT OFFICE.

CHARLES P. STALEY, OF INDIANAPOLIS, INDIANA.

PROCESS OF PREPARING VARNISHED SURFACES FOR REVARNISHING.

SPECIFICATION forming part of Letters Patent No. 673,665, dated May 7, 1901.

Application filed September 22, 1899. Serial No. 731,273. (No specimens.)

*To all whom it may concern:*

Be it known that I, CHARLES P. STALEY, a citizen of the United States, residing at Indianapolis, in the county of Marion and State of Indiana, have invented certain new and useful Improvements in Processes of Preparing Varnished Surfaces for Revarnishing; and I do declare the following to be a full, clear, and exact description of the invention, such as will enable others skilled in the art to which it appertains to make and use the same.

My invention has for one object to provide a process whereby surfaces of furniture and interior woodwork of buildings and the like that require renewal of varnish may be prepared therefor, so as to remove the perished and lusterless varnish which may have accumulated through repeated coatings or have becomed stained or cracked through accident or age and prepare the surface and restore the same to its natural state and to a proper condition to receive the recoating.

A further object is to provide such a process as may be safely employed without requiring the services of an expert operator in order to guard against injury to the finish of the surface to be recoated.

For the purpose of my invention I employ the ingredients hereinafter named, with which I mix or combine substances that are capable of forming a carrier and an absorbing base or body for the solution that is to destroy or disintegrate the old coating and that neutralize and arrest the action of the destructive agency and restore the surface to its natural color and previously-made-smooth state and prevent bleaching thereof.

I have found by careful experiments that the best substances to use with the ingredients herein stated are cornmeal and dry yellow ocher in the destructive agency and dry Venetian red in the arresting and restoring agency, the destructive and the arresting agencies or compositions being mixed and applied separately.

In carrying out my process I employ the following ingredients in or about the proportions stated: for nominally one gallon for the destructive element or agency, three quarts of water, preferably of moderate temperature, five ounces (avoirdupois weight) caustic potash, one quart of water, three ounces of cornmeal, one-half ounce of dry French yellow ocher, one gallon hot water, four ounces of oxalic acid, and one-half ounce of dry pigment Venetian red.

The aforesaid ingredients are first mixed in two separate vessels, so as to be capable of being applied separately, but which act together or one upon the other to attain the designed result. For convenience I designate the two parts as Nos. 1 and 2, respectively, which are prepared as follows:

No. 1. To three quarts of water add five ounces of caustic potash, which is occasionally stirred until thoroughly dissolved. Then to one quart of water add three ounces of cornmeal and one-half ounce of French yellow ocher, beating and stirring thoroughly until combined or mixed. Then allow this to stand for thirty minutes. Then the two solutions are to be put into one vessel and well beaten and mixed together.

No. 2. To one gallon of hot water add four ounces of oxalic acid and one-half ounce of dry Venetian-red pigment. Let stand until thoroughly dissolved, stirring occasionally to effect a complete mixture.

I do not confine myself to the exact proportions of the ingredients above stated, as such proportions may be varied according to conditions of the old coating of varnish required to be removed in order to regain a proper surface. When such old coating is excessive, it is most readily absorbed by employing an increased proportion of cornmeal.

In practical use the part No. 1 is applied to a surface of wood with a bristle brush or with a sponge, the solution being of such density as to not run or flow from the portions where applied. About one yard square of surface should be coated at a time, leaving it remain from two to ten minutes, depending upon the prior condition of the old varnish to be broken up and absorbed by the solution. Then remove the mixture with a sponge, frequently rinsing the same in water and squeezing it, so as to cleanse it. By this manipulation the old coating is destroyed and removed; but without further treatment the surface would be wholly unfit to receive a fresh coat of varnish. The part No. 2 is immediately applied with a sponge, (but in no case with the one used with No. 1,) rubbing the surface well with the sponge, using only sufficient of the solution to moisten the sponge thoroughly. The surface should then dry under normal conditions during from six to eight hours, when it will be in proper condition to receive either a filler or varnish, or wax, if it be a floor.

Should the application as above described not cause the removal of portions of the old coating where it may have been unusually thick, the applications to such portions may be repeated in exactly the same manner as specified.

This process may be employed upon either wood or metallic surfaces and is most effective where the surface has been finished in its natural color, but may also be employed when paint has been used in coating the surface and also upon waxed floors.

What I claim, and desire to secure by Letters Patent, is—

The process of preparing coated surfaces for recoating, which process consists in first applying to the old coating a thick mixture composed of water, caustic potash, cornmeal, and yellow ocher; then removing the mixture and the old coating with it; then applying to the denuded surfaces a thin mixture composed of water, oxalic acid, and Venetian-red pigment, and then allowing the same to dry upon the surfaces.

In testimony whereof I affix my signature in presence of two witnesses.

CHARLES P. STALEY.

Witnesses:
    WM. H. PAYNE,
    E. T. SILVIUS.